(12) United States Patent
Kootsey et al.

(10) Patent No.: US 7,568,181 B2
(45) Date of Patent: Jul. 28, 2009

(54) SYSTEM FOR BUILDING INTERACTIVE CALCULATIONS ON WEB PAGES

(75) Inventors: J. Mailen Kootsey, Redlands, CA (US); Grant McAuley, Loma Linda, CA (US); Hua Liu, San Diego, CA (US)

(73) Assignee: Loma Linda University, Loma Linda, CA (US)

( * ) Notice: Subject to any disclaimer, the term of this patent is extended or adjusted under 35 U.S.C. 154(b) by 74 days.

(21) Appl. No.: 10/505,717

(22) PCT Filed: Feb. 25, 2003

(86) PCT No.: PCT/US03/06276

§ 371 (c)(1), (2), (4) Date: May 4, 2005

(87) PCT Pub. No.: WO03/073279

PCT Pub. Date: Sep. 4, 2003

(65) Prior Publication Data

US 2005/0223351 A1 Oct. 6, 2005

Related U.S. Application Data

(60) Provisional application No. 60/319,123, filed on Feb. 25, 2002.

(51) Int. Cl.
*G06F 9/44* (2006.01)
(52) U.S. Cl. ........................................ 717/100
(58) Field of Classification Search ................ 717/100
See application file for complete search history.

(56) References Cited

U.S. PATENT DOCUMENTS 5,675,752 A * 10/1997 Scott et al. .................. 715/866

(Continued)

FOREIGN PATENT DOCUMENTS

EP    0953901 A2    11/1999

(Continued)

OTHER PUBLICATIONS

Ardissono, L; Barbero, C; Goy, A; Petrone, G; "An Agent Architecture for Personalized Web Stores", p. 182-189, ACM 1999, retrieved Mar. 29, 2007.*

(Continued)

*Primary Examiner*—Wei Y Zhen
*Assistant Examiner*—Junchun Wu
(74) *Attorney, Agent, or Firm*—Norman R. Van Treeck, Esq.; Sheldon Mak Rose & Anderson PC (57) ABSTRACT

A system for building interactive calculations on web pages, comprising a central processor for executing program instructions stored on computer readable media, interfaces in communication with the central processor, one or more computer readable media in communication with the central processor containing program instructions for executing a manager object for controlling the interaction of objects, one or more than one calculation objects (26, 28) in communication with the manager object, one or more than one input objects (14, 16, 18) controlling the model parameters, one or more than one output objects (20, 22, 24) displaying values of calculated variables, wherein the manager object, each of the input objects, and each of the output objects are coded with no model specific information, and model specific information is communicated through the manager object by parameter or variable name.

21 Claims, 2 Drawing Sheets

U.S. PATENT DOCUMENTS

| | | | |
|---|---|---|---|
| 6,083,276 A * | 7/2000 | Davidson et al. | 717/107 |
| 6,356,279 B1 * | 3/2002 | Halstead et al. | 345/619 |
| 6,425,120 B1 * | 7/2002 | Morganelli et al. | 717/109 |
| 6,684,385 B1 * | 1/2004 | Bailey et al. | 717/109 |
| 6,760,905 B1 * | 7/2004 | Hostetter et al. | 717/148 |
| 6,769,001 B2 * | 7/2004 | Halstead et al. | 707/103 R |
| 7,127,705 B2 * | 10/2006 | Christfort et al. | 717/113 |
| 7,302,675 B2 * | 11/2007 | Rogers et al. | 717/125 |
| 2002/0112229 A1 * | 8/2002 | Halstead et al. | 717/162 |
| 2003/0018484 A1 * | 1/2003 | Franks et al. | 705/1 |

FOREIGN PATENT DOCUMENTS

| | | | |
|---|---|---|---|
| JP | 2000-092117 | * | 4/1999 |
| WO | WO 01/98871 A2 | | 12/2001 |

OTHER PUBLICATIONS

Kersten, Mik; Murphy, Gail C; "Atlas: A Case Study in Building a Web-Based Learning Environment using Aspect-oriented Programming", p. 340-352, 1999 ACM, retrieved Mar. 29, 2007.*

El Saddik, Abdulmotaleb; Fischer, Stephan; Steinmetz, Ralf; "Reusability and Adaptability of Interactive Resources In Web-Based Educational Systems", 2001 ACM, retrieved Mar. 29, 2007.*

Ardissono, L; Barbero, C; Goy, A; Petrone, G; "An Agent Architecture for Personalized Web Stores", p. 182-189, ACM 1999.*

Kersten, Mik; Murphy, Gail C; "Atlas: A Case Study in Building a Web-Based Learning Environment using Aspect-oriented Programming", p. 340-352, 1999 ACM.*

El Saddik, Abdulmotaleb; Fischer, Stephan; Steinmetz, Ralf; "Reusability and Adaptability of Interactive Resources In Web-Based Educational Systems", 2001 ACM.*

* cited by examiner

SYSTEM FOR BUILDING INTERACTIVE CALCULATIONS ON WEB PAGES

CROSS REFERENCE TO RELATED APPLICATION

This application claims priority from International Application Number PCT/US03/06276, titled "System for Building Interactive Calculations on Web Pages." filed 25 Feb. 2003, which claims the benefit of provisional application Ser. No. 60/319,123, titled "Building Web Page Computation With a Library of Java Applets" filed Feb. 25, 2002.

COPYRIGHT STATEMENT

A portion of the disclosure of this patent document, namely, the program listings and screen shots, contain material which is subject to copyright protection. The copyright owner has no objection to the facsimile reproduction by anyone of the patent document or the patent disclosure, as it appears in the Patent and Trademark Office patent file records, but otherwise reserves all copyrights whatsoever.

BACKGROUND

The combination of a Web browser program with text in a markup language (e.g. HTML) delivered over the Internet by a server has become a popular and universal way to deliver knowledge content to users on demand, both text and graphics. In theory, at least, the browser program is made available on all computer platforms so that any user can view the content, regardless of the brand of hardware or the computer's operating system. Many powerful software tools have been designed to assist in laying out the content and writing the markup language code for pages containing combinations of text, static graphics, animations, movies, and sound clips.

There is, however, no technology available at present to simplify the building of interactive Web pages involving numeric calculations. An example of such a page would be an interactive simulation, where the user changes some parameter settings and then observes how the solution of a mathematical model changes. Both the parameter changes and output display are done typically with graphic objects on the screen, for example a slider for the parameter input and a graph or animation for the calculated output Also, the calculations are done typically with a general-purpose computer language different from the markup language describing the page, since markup languages are not suitable for calculations. Building a Web page with numeric calculations using present technology requires substantial programming effort, in the markup language describing the page (e.g., HTML) and mainly in the general computing language doing the actual calculations (e.g., JAVA (by Sun Microsystems)). Furthermore, changing the objects on the page (without changing the calculations) or changing the calculations (without changing the objects on the page) both require changes to both the markup language and the general language, making it impractical to reuse either of the codes.

What is needed is a new software architecture that will substantially reduce the work required to produce interactive calculations on Web pages and the skill level required to produce them.

SUMMARY

The present invention meets this need by providing a system for building interactive calculations on web pages, comprising a central processor for executing program instructions stored on computer readable media, interfaces in communication with the central processor, one or more computer readable media in communication with the central processor containing program instructions for executing a manager object for controlling the interaction of objects, one or more than one calculation objects (26, 28) in communication with the manager object, one or more than one input objects (14, 16, 18) controlling the model parameters, one or more than one output objects (20, 22, 24) displaying values of calculated variables, wherein the manager object, each of the input objects, and each of the output objects are coded with no model specific information, and model specific information is communicated through the manager object by parameter or variable name.

In one embodiment, the communication of model specific information is by supplying model specific information for each object as one or more parameters in an object call.

In a further embodiment, the input objects and the output objects communicate visual devices to the user interface. Additionally, optionally the visual devices for input objects are chosen from the group sliders, knobs, switches, buttons, and maps, and the visual devices for the output objects are chosen from the group graphs, animations, and indicators. In a still further optional embodiment, the system comprises a fifth computer readable medium in communication with the central processor containing program instructions for interactive construction of animations.

In a further embodiment, the user interface may be connected to an external hardware device, and in various embodiments the external hardware device could be a knob, switch, converted analog voltage, indicator, control relay, digital control, or analog control.

In another embodiment, the calculation objects comprise a model object, or a model object and a solver object. Additionally, optionally the model object comprises instructions for executing mathematical or logical equations for which an automatic solution algorithm is available. In a still further optional embodiment, the equations are chosen from the group including linear and nonlinear algebraic equations, ordinary and partial differential equations, difference equations, Boolean equations, cellular automata, and function generation. The solver object may also comprise instructions for executing general solution algorithms. In a still further embodiment, a sixth computer readable medium in communication with the central processor containing program instructions for interactive construction of the model object may be added.

In another embodiment, one or more of the computer readable media communicate with the central processor through a network, and in a still further embodiment, the program instructions for executing one or more than one object are executed on a remote processor.

In other embodiments, a web page may be displayed on the first user interface, the second user interface, or the first user interface and the second user interface, or program instructions for interactive construction of the web page may be added.

In various embodiments, the first user interface and the second user interface are not the same, and the various computer readable media are the not same.

A system for building interactive calculations on web pages is disclosed comprising a central processor means for executing program instructions stored on a computer readable medium; computer readable medium means connected to the central processor containing program instructions for executing manager means for controlling program interaction; means for calculation in communication with the manager means; means for input for controlling the model parameters, in communication with the manager means; means for output for displaying values of calculated variables, in communication with the manager means; wherein the manager means, each of the input means, and each of the output means are coded with no model specific information; and model specific information is communicated through the manager means by parameter or variable name.

A method for building interactive calculations on web pages is disclosed, comprising the steps of providing a central processor for executing program instructions stored on a computer readable medium; providing a computer readable medium connected to the central processor containing program instructions for executing: a manager object for controlling the interaction of objects; one or more than one calculation objects (26, 28) in communication with the manager object; one or more than one input objects (14, 16, 18) controlling the model parameters, in communication with the manager object; one or more than one output objects (20, 22, 24) displaying values of calculated variables, in communication with the manager object; wherein the manager object, each of the input objects, and each of the output objects are coded with no model specific information; and communicating model specific information through the manager object by parameter or variable name. In a further embodiment, the communicating of model specific information is by supplying model specific information for each object as one or more parameters in an object call.

A method for building interactive calculations on web pages is disclosed, comprising the steps of, under the control of a user system, accessing a web page; entering user defined equations; accessing a library of standard visual objects and selecting one or more of the standard visual objects; matching markup language code to each of the standard visual objects; and creating the layout of the standard visual objects on the web page.

A method for building interactive calculations on web pages is disclosed, comprising the steps of receiving user defined equations; providing a library of standard visual objects; receiving information for associating each of one or more than one standard visual object with markup language source code; and receiving layout information and displaying the layout of the visual objects on a web page.

DRAWINGS

These and other features, aspects, and advantages of the present invention will become better understood with reference to the following description, appended claims, and accompanying drawings, where:

DETAILED DESCRIPTION

The invention is a new software architecture that will substantially reduce the work required to produce interactive calculations on Web pages and the skill level required to produce them. The architecture is illustrated in the diagram in FIG. 2. This diagram shows the internal structure of a Web page calculation similar to the one shown in FIG. 1.

Figure 1:
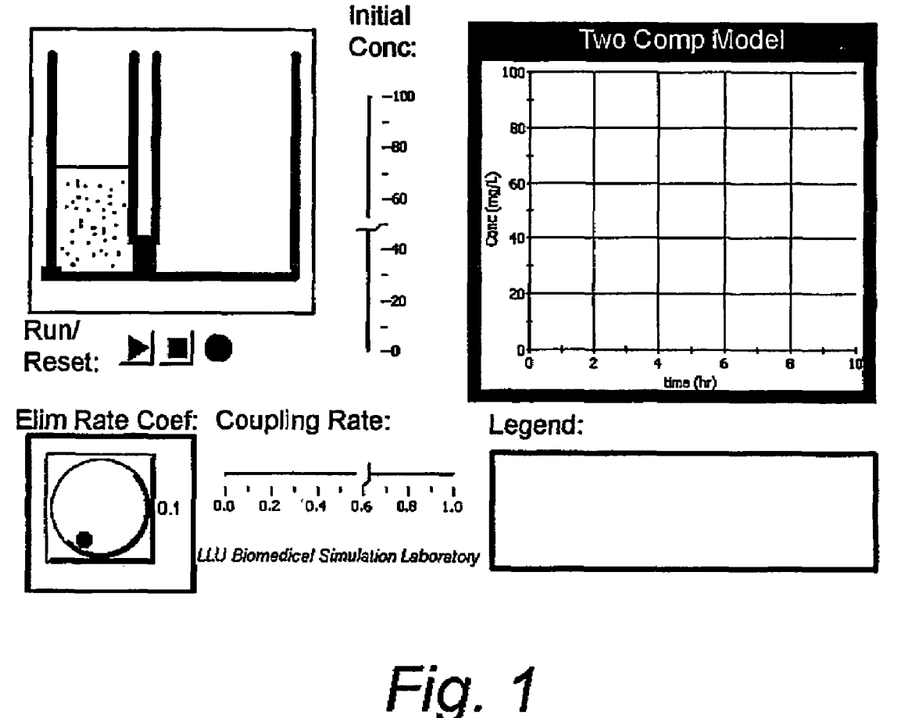
FIG. 1 is an example of an educational Web page constructed with JAVA (by Sun Microsystems) objects using the multi-object calculation architecture of the present invention.

With reference to FIG. 1, this shows an example of an educational web page, which might carry the following legend: "Two Compartment Model. Compartmental models are used to study the fate of a drug after it enters the body. Each compartment is an idealized volume containing the drug or chemical under study and the model represents the movement of drug between compartments. The body is divided into compartments representing regions the drug enters; some regions consist of a single anatomical organ such as the liver, while others are spread through the body, such as the volume of the circulation. The example below is a highly simplified two-compartment representation of the body, lumping all the plasma volume into the left compartment (blue) and all the extra-vascular tissue into the right compartment (green). At the start of the simulation, a dose of drug is added to the plasma compartment. During the simulation, the drug flows to the tissue compartment and is also removed (excreted) from the plasma."

As the web page represented in FIG. 1 operates, points could appear on the graph and values could appear in the legend box.

Figure 2:
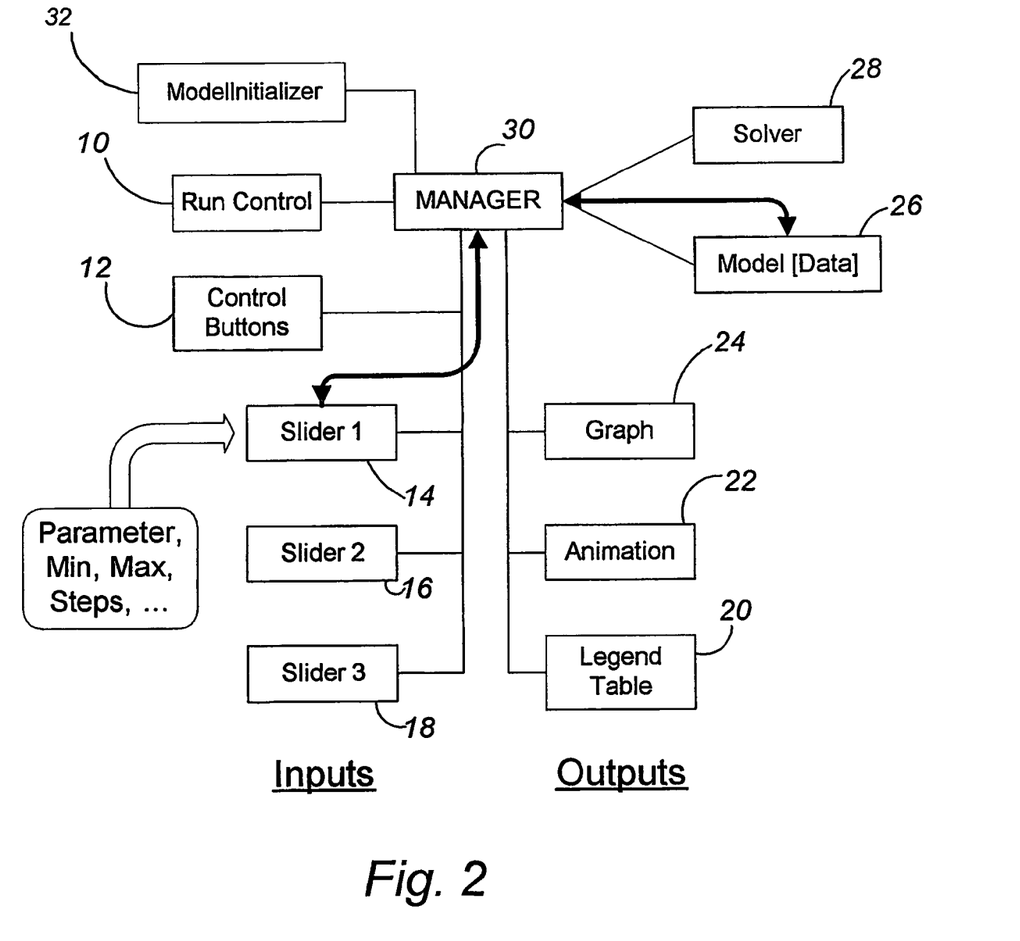
FIG. 2 is a block diagram of the multi-object Web page calculation architecture of the present invention.

Each of the boxes in FIG. 2 represents a code object written in a general computer language. These individual blocks of code run as independent threads and communicate with each other through the virtual machine executing the general language. The blocks of general code are controlled, through a browser plug-in, by code in the markup language describing the content and layout of the Web page. In the specific embodiment used to illustrate the new architecture, HTML and JAVA (by Sun Microsystems) are chosen as the markup and general computer languages, respectively, although other markup and general computer languages could be used, as will be evident to those skilled in the art with reference to this disclosure.

Note that there are three types of objects indicated in the figure: input objects 14, 16 and 18 controlling the model parameters, output objects 20, 22, and 24 displaying values of calculated variables, and control and calculation objects 10, 12, 26, 28, 30, and 32.

The first two types each have a visual presence on the Web page; the third type is visually represented only by a set of control buttons (12) to start or pause a simulation or to reset the variables and output displays, while the other objects are invisible.

With the exception of the Model, each of the objects in FIG. 2 is designed and coded in a general way, with no model- or configuration-specific information in the code. Model and configuration specific information for each object is supplied through parameter values in the <OBJECT> call in the HTML page. For example, in FIG. 2 slider 1 controls a parameter in the model. The name of this parameter and other characteristics of the slider necessary for this page (e.g., the maximum and minimum values available on the slider, the size of the steps available, etc.) are put into the <OBJECT> call in the HTML page. The value of the parameter, for purposes of calculation, is stored in the Model object and Slider 1 gets access to that memory location through the Manager object (the data path indicated by black arrows in the figure). Whenever the user changes the position of the slider, the new value is read out and stored in the Model object, so the updated value is available to other objects and for the calculation. Output objects connect to Model parameters and calculated variables in the same manner—through the Manager object, accessing each variable by name. Each output object is notified by the Manager object when a parameter changes or a calculation step is complete and new values are ready for display.

The new architecture permits broad and extensive use of all the objects with different Web pages and calculations without recoding. All the objects necessary to construct a Web page calculation, except for the Model, contain no model-specific information and are thus general and reusable. A library of coded objects can be assembled and an interactive calculation Web page constructed by including <OBJECT> calls for only those objects required on the page. This is a much simpler and less error-prone process than writing code for the entire page—interactions and calculations. Even the selection of objects for a calculation and the construction of the skeleton Web page (<OBJECT> calls only) can be simplified for the page builder through the use of a Wizard builder program (interactive query of the page builder). Constructing the Model object does require some programming skill, but this can be reduced through the use of a code template or through a separate program that allows the user to enter a model description in a different form.

Multiple objects on a Web page communicating through a common virtual machine is not in itself a new architecture. What is new is the communication of model-specific information through a Manager object by parameter or variable name. This communication is essential for making the objects general. In addition, the new architecture permits carrying model information over from one Web page to another. For example, an educational module on a specific system may require several Web pages with a progression of learning objectives and this architecture can retain one model and the state of the model through as many pages as needed.

Input objects controlling one or more model parameters can take many forms. Visual devices shown on the screen can include sliders, knobs, switches, buttons, and maps (values selected by clicking on different locations), for example. An input object can also be a connection to an external hardware device such as a knob, trackball, or lever, an input of voltage or current converted to a digital value, or data storage such as hard disk files.

Output objects displaying calculated variables and parameter values can also take many forms. Visual devices on the screen can include graphs with fixed or scrolling scales, animations, and other indicators such as "lights". Output objects can also be connected to hardware devices such as control relays, indicators and other external displays, actuators of physical processes, and data storage such as hard disk files.

A pair of objects, RunControl and ControlPanel, govern when calculations occur (vs. a paused state) and when variables in the Model get reset to their initial values. The ControlPanel has a visual presence on the screen, for example with three buttons ("Stop", "Run/Pause", and "Reset") and a visual device that moves to indicate active calculations.

The Model object can contain any type or combination of mathematical or logical equations for which an automatic solution algorithm is available, including: Linear and nonlinear algebraic equations, Ordinary and partial differential equations, Difference equations, Logical (boolean) equations, cellular automata, Function generation, or statistics, including equations, approximations, and table lookup/interpolation. The Model object can also contain a connection to a remote computer or supercomputer through a data network, with the calculations being done remotely, e.g., the program instructions for executing one or more than one calculation object are executed on a remote processor, and the numerical results being transferred back to the Model object The Solver object can be chosen from a library of general solution algorithms for the various types of equations listed above. These algorithms are well known and are documented in many books and articles.

The multi-object architecture can also be implemented with network connections. In other words, the individual objects can reside on different computers linked by network connections. This makes possible distributed calculations, e.g., simulation, measurement, or control for education or research with interactive inputs on one or more workstations, computation on another computer (supercomputer?), and output display or control on still other computers.

A description of one embodiment of operations sufficient to implement one embodiment of this system is presented in prose and pseudocode in Table 1.

Table 1

Description of Code for Objects

Basic Requirements and System Initialization:
1. The architecture uses a virtual machine capable of multi-threaded operation and methods of thread synchronization. Some of the objects are initiated from the markup language and run in their own threads. These in turn initiate other objects. The order that the objects are loaded is undetermined and considered random. However, proper operation requires ordered creation of core objects. The first object to load creates a Manager. RunControl and ModelInitializer have to be initialized next; other objects wait to be initialized until this sequence is complete.
2. There must be only one instance each of the Manager, RunControl, ModelInitializer, and ControlPanel objects in the virtual machine. Once created the Manager persists for all pages, while the other three are replaced with each new page.
3. All objects that are initiated from the markup language are configured by their parameter values, including connection to Model variables and parameters as well as visual appearance and scaling. During initialization all objects connect to the Manager.
4. Parameters of the ModelInitializer specify what Model and Solver classes to create, along with parameters needed by these classes.
5. For input objects, initialization consists of the following steps:
   Connect to manager
   Add to Manager's list of inputs
   Read parameters from markup code
   If parameter name in markup code does not match a name in the Model, Error
   Obtain from the Manager the index of the parameter in the Model
   Add to Manager's list of objects bound to this parameter
   If "initial value" parameter exists:
      Request Manager to update value in Model
      Request the Manger to update all objects bound to the parameter
   Notify the next object waiting to be initialized
6. For output objects initialization consists of the following steps:
   Connect to Manager
   Add to Manager's list of outputs
   Read parameters from markup code
   For all Model parameters named in the markup code
      If the name does not match a name in the Model, Error
      Obtain from the Manager the index of the parameter in the Model
      Add to Manager's list of objects bound to this parameter For all Model variables named in the markup code
  If the name does not match a name in the Model, Error
    Obtain from the Manager the index of the variable in the Model
  Notify the next object waiting to be initialized
7. After all objects are initialized the system is initialized and ready to run.

Preparation to Run:
  If Model is ready to run and an input object requests a change to a Model parameter
    Request Manager to update the value of the Model parameter
    Request Manager to update the inputs and outputs bound to the parameter Running the Model:
  Calculation is controlled by a Run Loop in the RunControl object The Run Loop may run in a continuous mode, or by a set number of iterations.
  PreRun: Before the Run Loop is initiated, the RunControl requests the Manager to prepare the ControlPanel, and all the inputs and outputs for the run.
  Start: Initiation of the Run Loop may begin automatically after the system in initialized, or in response to a user action (e.g., a mouse click on the Run button of the Control Panel). In each iteration of the loop:
    Increments the time step
    Request the Manager to
      Pass the value for time to the Model
      Request Model for new values of variables for this time
    Model, optionally with the help of a Solver, calculates the new value for each of the Model variables
    Request Manager to send updated values to outputs in the Manager's output list
    Outputs update themselves
  Pause:
  Request Manager to pause Run Loop
  Request Manager to call pause method of outputs in Manager's outputs list
  Resume:
  Request Manager to call restart method of outputs in Manager's outputs list
  Request Manager to resume Run Loop
  Stop/Reset:
  RequestManager to:
    If Run Loop is running or paused, stop Run Loop
    Reset all outputs in Manager's output list
    Reset the RunControl
    Prepare ControlPanel to be ready for next run
    Optionally:
      Reset Model parameters to their default values
      Update all inputs and outputs bound to these parameters
      Update Model variables
      Update all outputs in the Manager's list of outputs
  PostRun: After the last iteration of the Run Loop, the RunControl request of the Manager to do any necessary post run procedures to the ControlPanel, and all the inputs and outputs.

Remote Objects:
  Remote operation allows collaborative interaction through a network between a "main" page on one computer, and a "remote" page on another computer, both built with the object technology. A commonly accessed "object space" on a separate server is used to exchange model and run control information between the Manager of the "main" page and the RemoteManager of the "remote" page. A RemoteManager, like a Manager, is a unique object in the user's virtual machine that persists for all pages. Unlike the main page, the remote page does not require RunControl or ModelInitializer objects; all necessary model and control information is made available to the RemoteManager through the object space. Variable/parameter updates on the main page are sent to the remote page by a special RemoteOutput object. When the RemoteOutput is updated by the Manager, it sends parameter or variable information to the object space. The RemoteManager monitors the object space, and updates inputs bound to parameters, or outputs watching the variables. In a similar way, the RemoteManager communicates changes in parameters initiated by the remote user to the main page by placing the new parameter information in the object space. The Manager monitors the object space, updates Model parameter values, and notifies the input and outputs bound to the parameters of interest System Initialization described above requires the following modifications for a remote configuration:
    If the ModelInitializer markup parameter indicates a remote configuration,
      Request Manager to:
        Create and initialize object space
        Add Model variable and parameter names to the object space
        Add necessary run control information to the object space
        Add parameter value information to the object space
        Create a RemoteOutput
        Bind all Model parameters to a RemoteOutput object
        Add RemoteOutput to its list of Outputs.
    If the object is a remote Input, replace "Manager" by "RemoteManager" the in Input initialization described above
    If the object is a remote Output, replace "Manager" by "RemoteManager" the in Output initialization described above Preparation to Run described above requires the following modifications for a remote configuration:
    If a Remote Input object changes a Model parameter
      Request Remote Manager to:
        Update the value of the parameter in object space
        Update the remote inputs bound to the parameter Running the Model described above requires the following modifications for a remote configuration:
    "Manager" can generally be replaced by "RemoteManager" when considering remote inputs and outputs.
    Appropriate attention must also be given to the object space pre/post run and control operations (e.g., Reset).

End of Table 1

Sample HTML code useable as an HTML page in such embodiment is presented in Appendix A. The sample HTML code shows only how the necessary objects for an interactive page are described; not shown are the lines of HTML code necessary to position these objects on the page or to include text and other graphics on the page, as these functions are standard in the HTML language and are not altered by the new technology. As will be evident to those skilled in the art with reference to this disclosure, other embodiments are possible.

While originally inspired by a need for interactive simulations in educational applications, the new architecture has a much broader application, including educational simulations or simulation-driven animations at all levels, from kindergarten through graduate and professional training, instrumentation, measurement, and data recording with a Web interface, process or device control with a Web interface, robotics, mixed applications, including some combination of measurement, calculation, and control, collaborative learning in the laboratory or classroom (networked objects), and collaborative research linking multiple geographic sites. Even Web pages for sales could use interactive calculations to customize a quote or other estimate for the user.

In one embodiment it would be possible to market only a library of pre-programmed objects. Users would have to be skilled in writing markup language (e.g. HTML) code for Web pages and would need some programming experience to write the Model object.

In another embodiment, an interactive builder program to construct the HTML code is added to the object library. In this embodiment, HTML writing skills would not be necessary.

In a still further embodiment, an interactive program to construct the Model object is used, eliminating the need for any programming skills.

In a still further embodiment, an interactive drawing program to aid construction of animations is added, allowing versatile and visual Web simulation to be constructed with minimal specialized skills.

A method is disclosed for building interactive calculations on web pages, comprising the steps of, under the control of a user system, accessing a web page; entering user defined equations; accessing a library of standard visual objects and selecting one or more of the standard visual objects; matching markup language code to each of the standard visual objects; and creating the layout of the standard visual objects on the web page.

A method is described for building interactive calculations on web pages, comprising the steps of receiving user defined equations; providing a library of standard visual objects; receiving information for associating each of one or more than one standard visual object with markup language source code; and receiving layout information and displaying the layout of the visual objects on a web page.

A typical user system upon which the present invention may be implemented will be apparent to those of ordinary skill in the art. One typical user system includes a bus or other internal communication means for communicating information, and a processor coupled to the bus for processing information. Such a system further comprises a random access memory (RAM) or other volatile storage device (referred to as main memory), coupled to the bus for storing information and instructions to be executed by processor. Main memory also may be used for storing temporary variables or other intermediate information during execution of instructions by processor. The system may also comprise a read only memory (ROM) and/or static storage device coupled to the bus for storing static information and instructions for the processor, and a mass storage device such as a magnetic disk drive or optical disk drive.

The mass storage device may be coupled to the bus and is typically used with a computer readable medium, such as a magnetic or optical disk, for storage of information and instructions. The system may further be coupled to a display device, such as a cathode ray tube (CRT) or a liquid crystal display (LCD) for displaying information to a computer user. An alphanumeric input device, including alphanumeric and other keys, may also be coupled to the bus for communicating information and command selections to the processor.

As used herein, a "computer readable medium" is any presently existing or future developed computer readable medium suitable for storing and quickly retrieving data, including, but not limited to hard drives, RAM, compact discs ("CDs"), and DVDs. Moreover, the computer readable medium can comprise more than one device, such as two linked hard drives.

A communication device may be coupled to the bus for use in accessing other nodes of a network computer system or other computer peripherals. This communication device may include any of a number of commercially available networking peripheral devices such as those used for coupling to an Ethernet, token ring, Internet, or wide area network. It may also include any number of commercially available peripheral devices designed to communicate with remote computer peripherals such as scanners, terminals, specialized printers, or audio input/output devices. The communication device may also include an RS232 or other conventional serial port, a conventional parallel port, a small computer system interface (SCSI) port or other data communication means. Wireless means of data transfer devices such as the infrared IRDA protocol, spread-spectrum, or wireless LAN may be used.

It will be apparent to those of ordinary skill in the art, however that other alternative systems of various system architectures may also be used.

The software implementing the present invention can be stored in main memory, a mass storage device, or other storage medium accessible to the processor. It will be apparent to those of ordinary skill in the art that the methods and processes described herein can be implemented as software stored in main memory or read only memory and executed by a processor. This software may also be resident on an article of manufacture comprising a computer usable mass storage medium having computer readable program code embodied therein and being readable by the mass storage device and for causing the processor to perform digital information library transactions and protocols in accordance with the teachings herein.

In the foregoing specification, the invention has been described with reference to specific embodiments thereof. It will, however, be evident that various modifications and changes may be made thereto without departing from the broader spirit and scope of the invention. For example, input and output objects can be connections to external hardware such as knobs, switches, or a converted analog voltage for inputs or indicators, control relays, or digital or analog control for outputs. The Model object can contain a connection to a remote computer or supercomputer, so that the numerical calculations are done remotely, with the calculated variable values transferred back to the Model object for storage and output. The specification and drawings are, accordingly, to be regarded in an illustrative rather than a restrictive sense. It should be appreciated that the present invention should not be construed as limited by such embodiments, but rather construed according to the below claims.

APPENDIX A

Sample HTML Page Using Objects; No Layout or Other Content Added

```
<OBJECT
    ID          = "Starter"
    CLASSID     = "clsid:8AD9C840-044E-11D1-B3E9-00805F499D93"
    CODEBASE    = "http://java.sun.com/products/plugin/autodl/jinstall-1_4-win.cab#Version=1,4,0,0"
    WIDTH       = "0"
    HEIGHT      = "0"
    HSPACE      = "0"
    VSPACE      = "0"
    ALIGN       = "top"
>
    <PARAM NAME = "type" VALUE="application/x-java-applet;version=1.4"/>
    <PARAM NAME = "cache_archive" VALUE = "nlx_c.jar,nlx_s.jar,nlx_lx.jar,nlx_jc.jar"/>
    <PARAM NAME = "cache_version" VALUE = "1.0.0.0,1.0.0.0,1.0.0.0,1.0.0.0"/>
    <PARAM NAME = "code" VALUE = "multiapplets.manager.StarterApplet.class"/>
    <!-- <PARAM NAME = "contoremote" VALUE = "false"/> -->
    <PARAM NAME = "modelclass" VALUE = "multiapplets.model.biology.PredPreyModel"/>
    <PARAM NAME = "solverclasses" VALUE = "multiapplets.solver.ode.rk4.RK4Solver"/>
    <PARAM NAME = "solverpars" VALUE = "0.1"/>
</OBJECT>
<OBJECT
    ID          = "runControl"
    CLASSID     = "clsid:8AD9C840-044E-11D1-B3E9-00805F499D93"
    CODEBASE    = "http://java.sun.com/products/plugin/autodl/jinstall-1_4-win.cab#Version=1,4,0,0"
    WIDTH       = 0
    HEIGHT      = 0
    HSPACE      = 0
    VSPACE      = 0
    ALIGN       = middle
>
    <PARAM NAME = "type" VALUE="application/x-java-applet;version=1.4"/>
    <PARAM NAME = "cache_archive" VALUE = "nlx_c.jar,nlx_s.jar,nlx_lx.jar,nlx_jc.jar"/>
    <PARAM NAME = "cache_version" VALUE = "1.0.0.0,1.0.0.0,1.0.0.0,1.0.0.0"/>
    <PARAM NAME = "code" VALUE = "multiapplets.control.runcontrol.DefaultRunControl.class"/>
    <PARAM NAME = "starttime" VALUE = "0"/>
    <PARAM NAME = "stoptime" VALUE = "100"/>
    <PARAM NAME = "numbreakpoints" VALUE = "201"/>
    <PARAM NAME = "maxsetcount" VALUE = "3"/>
</OBJECT>
<OBJECT
    ID          = "controlPnl"
    CLASSID     = "clsid:8AD9C840-044E-11D1-B3E9-00805F499D93"
    CODEBASE    = "http://java.sun.com/products/plugin/autodl/jinstall-1_4-win.cab#Version=1,4,0,0"
    WIDTH       = 100
    HEIGHT      = 50
    HSPACE      = 0
    VSPACE      = 0
    ALIGN       = middle
>
    <PARAM NAME = "type" VALUE="application/x-java-applet;version=1.4"/>
    <PARAM NAME = "cache_archive" VALUE = "nlx_c.jar,nlx_s.jar,nlx_lx.jar,nlx_jc.jar"/>
    <PARAM NAME = "cache_version" VALUE = "1.0.0.0,1.0.0.0,1.0.0.0,1.0.0.0"/>
    <PARAM NAME = "code" VALUE = "multiapplets.control.panel.BSLDefaultControlPnl.class"/>
    <!-- <PARAM NAME = "bgcolor" VALUE = "lightGray"/> -->
    <!-- <PARAM NAME = "runcolor" VALUE = "green"/> -->
    <!-- <PARAM NAME = "pausecolor" VALUE = "yellow"/> -->
    <!-- <PARAM NAME = "stopcolor" VALUE = "red"/> -->
    <!-- <PARAM NAME = "indicatordelay" VALUE = "150"/> -->
</OBJECT>
<OBJECT
    ID          = "slider_"
    CLASSID     = "clsid:8AD9C840-044E-11D1-B3E9-00805F499D93"
    CODEBASE    = "http://java.sun.com/products/plugin/autodl/jinstall-1_4-win.cab#Version=1,4,0,0"
    WIDTH       = 150
    HEIGHT      = 80
    HSPACE      = 0
    VSPACE      = 0
```

APPENDIX A-continued

Sample HTML Page Using Objects; No Layout or Other Content Added

```
    ALIGN       = middle
>
    <PARAM NAME = "type" VALUE="application/x-java-applet;version=1.4"/>
    <PARAM NAME = "cache_archive" VALUE =
"nlx_c.jar,nlx_s.jar,nlx_lx.jar,nlx_jc.jar"/>
    <PARAM NAME = "cache_version" VALUE = "1.0.0.0,1.0.0.0,1.0.0.0,1.0.0.0"/>
    <PARAM NAME = "code" VALUE =
"multiapplets.view.input.gui.slider.BSLSlider.class"/>
    <!-- <PARAM NAME = "isremote" VALUE = "false"/> -->
    <PARAM NAME = "paramname" VALUE = "preyReproRate"/>
    <PARAM NAME = "lowvalue" VALUE = "0.0"/>
    <PARAM NAME = "highvalue" VALUE = "0.5"/>
    <PARAM NAME = "labelstep" VALUE = "0.1"/>
    <PARAM NAME = "precision" VALUE = "0.02"/>
    <PARAM NAME = "fracdigits" VALUE = "2"/>
    <!-- <PARAM NAME = "bgcolor" VALUE = "lightGray"/> -->
    <!-- <PARAM NAME = "orientation" VALUE = "0"/> -->
    <PARAM NAME = "disableonrun" VALUE = "false"/>
    <!-- <PARAM NAME = "initvalue" VALUE = "DEFAULT VALUE IS WHAT IS SET IN
MODEL"/> -->
</OBJECT>
<OBJECT
    ID          = "graph_"
    CLASSID     = "clsid:8AD9C840-044E-11D1-B3E9-00805F499D93"
    CODEBASE    = "http://java.sun.com/products/plugin/autodl/jinstall-1_4-
win.cab#Version=1,4,0,0"
    WIDTH       = 300
    HEIGHT      = 300
    HSPACE      = 0
    VSPACE      = 0
    ALIGN       = middle
>
    <PARAM NAME = "type" VALUE="application/x-java-applet;version=1.4"/>
    <PARAM NAME = "cache_archive" VALUE =
"nlx_c.jar,nlx_s.jar,nlx_lx.jar,nlx_jc.jar"/>
    <PARAM NAME = "cache_version" VALUE = "1.0.0.0,1.0.0.0,1.0.0.0,1.0.0.0"/>
    <PARAM NAME = "code" VALUE =
"multiapplets.view.output.graph.BSLGraph.class"/>
    <!-- <PARAM NAME = "isremote" VALUE ="false"/> -->
    <PARAM NAME = "varnames" VALUE = "time,pred,prey"/>
    <!-- <PARAM NAME = "varnames2" VALUE = "SEDOND SET OF VARIABLE NAMES,
SEPARATED BY COMMAS, GO HERE"/> -->
    <!-- <PARAM NAME = "varcolors" VALUE =
"blue,green,red,black,cyan,navy,purple,magenta,blue,..."/> -->
    <!-- <PARAM NAME = "varcolors2" VALUE =
"magenta,purple,navy,cyan,black,red,green,blue,magenta,..."/> -->
    <!-- <PARAM NAME = "varvisibilities" VALUE = "true,true,true, ..."/> -->
    <!-- <PARAM NAME = "varvisibilities2" VALUE = "true,true,true,..."/> -->
    <!-- <PARAM NAME = "title" VALUE = ""/> -->
    <!-- <PARAM NAME = "subtitle" VALUE = ""/> -->
    <!-- <PARAM NAME = "graphcolors" VALUE =
"blue,blue,white,yellow,blue,blue,cyan"/> -->
    <!-- <PARAM NAME = "plotstyle" VALUE = "point (line)"/> -->
    <!-- <PARAM NAME = "showptvalues" VALUE = "true"/> -->
    <!-- <PARAM NAME = "decplaces" VALUE = "2"/> -->
    <PARAM NAME = "xaxislabel" VALUE = "time (hr)"/>
    <!-- <PARAM NAME = "xscaletype" VALUE = "linear (log)"/>**NOT YET
IMPLEMEMTED** - -->
    <!-- <PARAM NAME = "xgrid" VALUE = "true"/> -->
    <!-- <PARAM NAME = "xtickspacing" VALUE = "DEFAULT IT AUTOMATIC TICK
SELECTION"/> -->
    <PARAM NAME = "xmin" VALUE = "0.0"/>
    <PARAM NAME = "xmax" VALUE = "100.0"/>
    <PARAM NAME = "yaxislabel" VALUE = "Number of predators, prey"/>
    <!-- <PARAM NAME = "yscaletype" VALUE = "linear (log)"/> -->
    <!-- <PARAM NAME = "ygrid" VALUE = "true"/> -->
    <!-- <PARAM NAME = "ytickspacing" VALUE = "DEFAULT IT AUTOMATIC TICK
SELECTION"/> -->
    <PARAM NAME = "ymin" VALUE = "0.0"/>
    <PARAM NAME = "ymax" VALUE = "1200.0"/>
    <!-- <PARAM NAME = "y2axislabel" VALUE = ""/> -->
    <!-- <PARAM NAME = "y2scaletype" VALUE = "linear (log)"/> -->
    <!-- <PARAM NAME = "y2grid" VALUE = "false"/> -->
    <!-- <PARAM NAME = "y2tickspacing" VALUE = "DEFAULT IT AUTOMATIC TICK
SELECTION"/> -->
    <!-- <PARAM NAME = "y2min" VALUE = "0.0"/> -->
    <!-- <PARAM NAME = "y2max" VALUE = "1.0"/> -->
```

APPENDIX A-continued

Sample HTML Page Using Objects; No Layout or Other Content Added

```
<!-- <PARAM NAME = "numofdecades" VALUE = "2"/> -->
<!-- <PARAM NAME = "numofdecades2" VALUE = "2"/> -->
<!-- <PARAM NAME = "hide2ndset" VALUE = "false (true)"/> -->
<!-- <PARAM NAME = "showpopupmenu" VALUE = "true (false)"/> -->
</OBJECT>
```

What is claimed is:

1. A system for building interactive calculations on web pages, comprising:
    a central processor for executing program instructions stored on one or more than one computer readable medium;
    a first user interface in communication with the central processor;
    a second user interface in communication with the central processor;
    a first computer readable medium in communication with the central processor containing program instructions for executing a manager object for controlling interaction of objects;
    a second computer readable medium in communication with the central processor containing program instructions for executing one or more than one calculation objects in communication with the manager object on the first computer readable medium;
    a third computer readable medium in communication with the central processor containing program instructions for executing one or more than one input objects controlling model parameters, in communication with the manager object on the first computer readable medium and the first user interface;
    a fourth computer readable medium in communication with the central processor containing program instructions for executing one or more than one output objects displaying values of calculated variables, in communication with the manager object on the first computer readable medium and the second user interface;
    wherein the manager object, each of the input objects, and each of the output objects are coded with no model specific information; and model specific information is communicated through the manager object by parameter or variable name.

2. The system of claim 1, wherein the communication of model specific information is by supplying model specific information for each object as one or more parameters in an object call.

3. The system of claim 1, wherein the input objects and the output objects communicate visual devices to the user interface.

4. The system of claim 3, wherein the visual devices for input objects are chosen from the group sliders, knobs, switches, buttons, and maps, and the visual devices for the output objects are chosen from the group graphs, animations, and indicators.

5. The system of claim 4, further comprising a fifth computer readable medium in communication with the central processor containing program instructions for interactive construction of animations.

6. The system of claim 1, wherein the user interface is connected to an external hardware device.

7. The system of claim 6, where the external hardware device is a knob, switch, convened analog voltage, indicator, control relay, digital control, or analog control.

8. The system of claim 1, wherein the calculation objects comprise a model object, or a model object and a solver object.

9. The system of claim 8, wherein the model object comprises instructions for executing mathematical or logical equations for which an automatic solution algorithm is available.

10. The system of claim 9, wherein the equations are chosen from the group including linear and nonlinear algebraic equations, ordinary and partial differential equations, difference equations, Boolean equations, cellular automata, and function generation.

11. The system of claim 8, wherein the solver object comprises instructions for executing general solution algorithms.

12. The system of claim 8, further comprising a sixth computer readable medium in communication with the central processor containing program instructions for interactive construction of the model object.

13. The system of claim 1 wherein one or more of the computer readable media communicate with the central processor through a network.

14. The system of claim 13, wherein the program instructions for executing one or more than one object are executed on a remote processor.

15. The system of claim 1, further comprising a seventh computer readable medium in communication with the central processor containing program instructions for displaying a web page on the first user interface, the second user interface, or the first user interface and the second user interface.

16. The system of claim 15, further comprising an eighth computer readable medium in communication with the central processor containing program instructions for interactive construction of the web page.

17. The system of claim 1, wherein the first user interface and the second user interface are not the same.

18. The system of claim 1, wherein the first, second, third, and fourth computer readable media are the not same.

19. A system for building interactive calculations on web pages, comprising:
    central processor means for executing program instructions stored on a computer readable medium;
        computer readable medium means connected to the central processor containing program instructions for executing:
        manager means for controlling program interaction;
        means for calculation in communication with the manager means;
        means for input for controlling model parameters, in communication with the manager means;
        means for output for displaying values of calculated variables, in communication with the manager means;

wherein the manager means, each of the input means, and each of the output means are coded with no model specific information; and model specific information through the manager means by parameter or variable name.

20. A method for building interactive calculations on web pages, comprising the steps of:

providing a central processor for executing program instructions stored on a computer readable medium;

providing a computer readable medium connected to the central processor containing program instructions for executing:

a manager object for controlling interaction of objects;

one or more than one calculation objects in communication with the manager object;

one or more than one input objects controlling model parameters, in communication with the manager object;

one or more than one output objects displaying values of calculated variables, in communication with the manager object;

wherein the manager object, each of the input objects, and each of the output objects are coded with no model specific information; and communicating model specific information through the manager object by parameter or variable name.

21. The method of claim 20, wherein the communicating of model specific information is by supplying model specific information for each object as one or more parameters in an object call.

* * * * *